United States Patent [19]

Renzo et al.

[11] Patent Number: 4,548,566
[45] Date of Patent: Oct. 22, 1985

[54] AUTOMATIC MACHINE FOR FORMING AND DISTRIBUTING BAKERY PRODUCTS OF VARIOUS SHAPES IN BAKING TINS

[76] Inventors: Folli Renzo, Via I. Bedeschi, 5-48017 Conselice (Ravenna); Casadei Marino, Via Provinciale S. Mauro, 3501-47023 Cesena (Forli), both of Italy

[21] Appl. No.: 613,083

[22] Filed: May 22, 1984

[30] Foreign Application Priority Data

Jun. 3, 1983 [IT]  Italy ............................... 3447 A/83

[51] Int. Cl.⁴ .................... A21C 3/04; A21C 11/10
[52] U.S. Cl. .................................... 425/110; 425/136; 425/137; 425/142; 425/150; 425/153; 425/154; 425/308
[58] Field of Search ............... 425/142, 145, 147, 113, 425/114, 117, 126 R, 153, 152, 155, 154, 156, 159, 164, 202, 136, 137, 308, 238, 261; 99/509, 537, 538, 567, 432, 443 R; 426/512

[56] References Cited

U.S. PATENT DOCUMENTS

| | | | |
|---|---|---|---|
| 2,446,201 | 8/1948 | Turner | 425/145 |
| 2,781,732 | 2/1957 | Lenherr | 425/145 |
| 2,923,257 | 2/1960 | Monaco | 425/310 |
| 3,034,455 | 5/1962 | Roth et al. | 425/136 |
| 3,196,810 | 7/1965 | Roth | 425/310 |
| 3,830,608 | 8/1974 | Sebastian | 425/261 |

*Primary Examiner*—Willard E. Hoag
*Attorney, Agent, or Firm*—Balogh, Osann, Kramer, Dvorak, Genova & Traub

[57] ABSTRACT

Disclosed herein is a machine comprising a sweetened paste kneading device that supplies an extrusion group constituted by two telescopically coupled, vertical tubular blocks, namely a first fixed tubular block and a second movable tubular block closed at the bottom by an extrusion plate which, with the said tubular blocks, defines a variable volume chamber; and a conveyor that supplies baking tins in succession to the overhead said extrusion group.

When the variable volume chamber is full of paste, "piped" or "poured in" biscuits are created with, in the first instance, the volume of the said chamber maintained constant and, in the latter, firstly a decrease and then a volumetric increase. When the paste is "piped", the separation from the said extrusion plate of the ropes of extruded paste is achieved with the use of cutting means, while for "poured in" paste, it occurs through breakage caused by the decompression of the paste in the said chamber.

When no paste is in the chamber, "poured in" biscuits are created through, in this order, a reduction in the volume of the chamber, the operation of the kneading device, with the consequent extrusion of the paste, and then an increase in the volume of the chamber with the breakage, through decompression, of the ropes of extruded paste.

14 Claims, 18 Drawing Figures

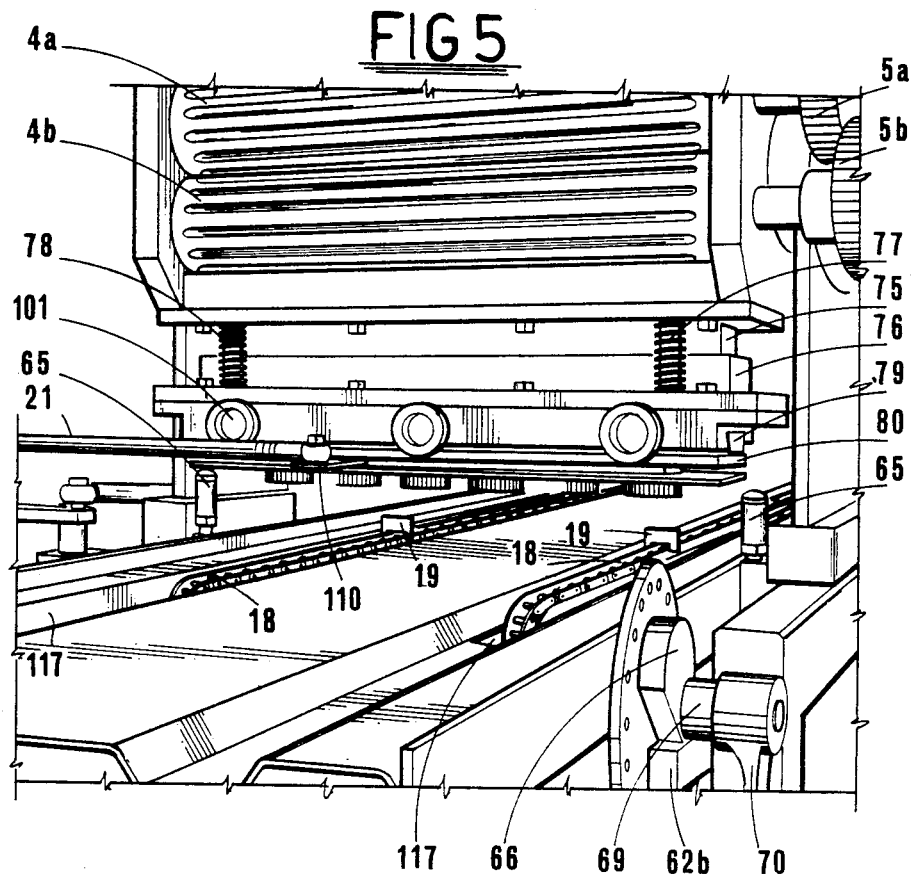
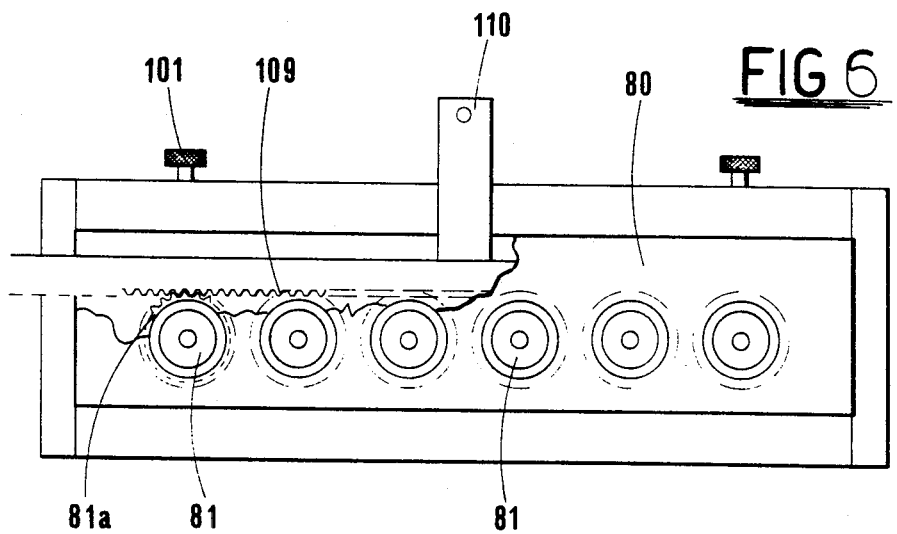

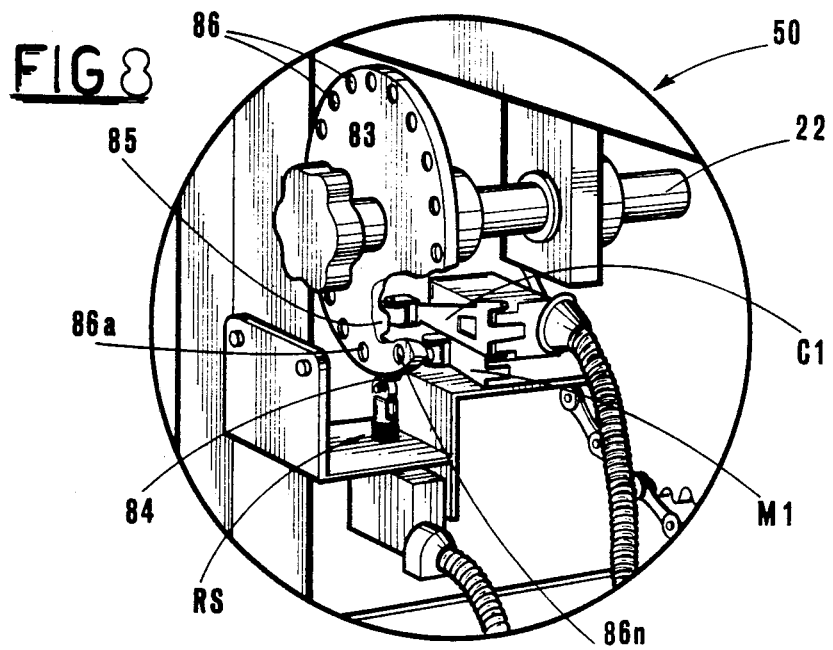
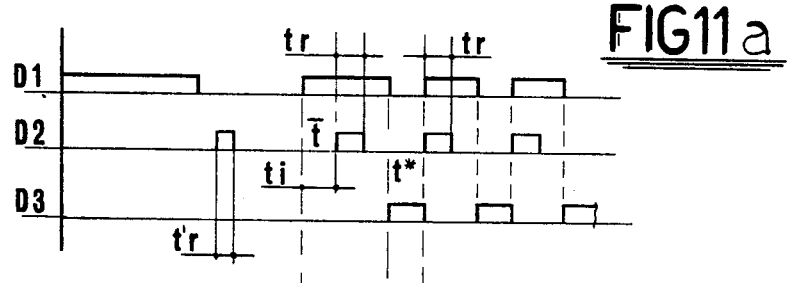
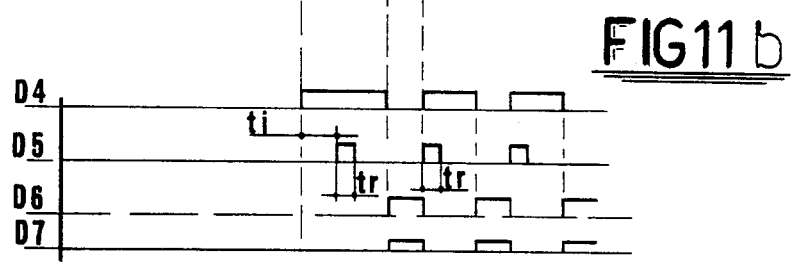
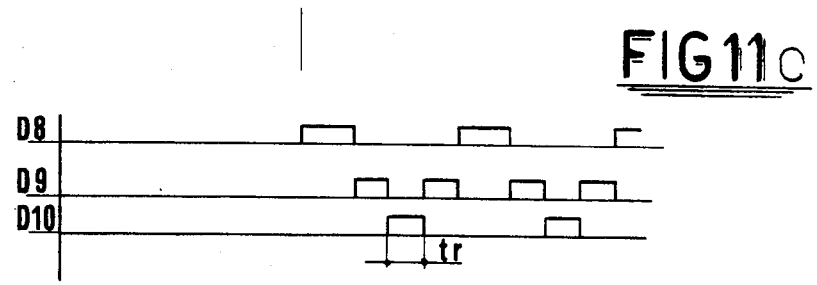

AUTOMATIC MACHINE FOR FORMING AND DISTRIBUTING BAKERY PRODUCTS OF VARIOUS SHAPES IN BAKING TINS

BACKGROUND OF THE INVENTION

The invention relates to an automatic machine for forming and distributing bakery products of various shapes in baking tins, in particular what are known in Italy as "piped" and "poured in" biscuits.

DESCRIPTION OF THE PRIOR ART Machines are already known that carry out the above mentioned operations, and these comprise a conveyor that supplies baking tins in succession to an overhead sweetened paste kneading device in which is included an extrusion group that supplies ropes of paste which, under the action of a cutting device, are subdivided into many pieces of a length adjustable constantly up to the formation of which are called "piped" biscuits whose length corresponds to the maximum dimension of the baking tin.

The various operating parts of the machine, that is to say, the paste kneading device, the conveyor supplying the baking tins, and the cutting device for subdividing the ropes of paste, are each driven by a geared motor group, each of which is independent of the others and is interlocked to electrical operating means tripped by cams or mechanical devices.

With the cutting device rendered inoperative, the said machines are utilized to create what are called "poured in" biscuits.

The separation of the "poured in" biscuits from the extrusion group is brought about mainly through a traction action applied to the ropes of paste located in proximity of the extrusion group, caused by the baking tins moving forward one step. In many cases, the breaking (tearing) of the ropes does not take place in an optimal fashion, thereby giving rise to all the consequential problems this involves.

With the above mentioned machines, the formation is not possible of "poured in" biscuits in which there are external helical lines (for example of the sugary type known in Italy as "spumini"), and this undoubtedly represents a limitation in the possibilities of the said machines.

SUMMARY OF THE INVENTION

The object of the invention is to make available an extremely versatile improved machine with which one can create biscuits of both the "piped" and the "poured in" type without, in respect of the former, any limitation in length and contour and, as regards the latter, any limitation in thickness and contour, and to do so in a fully optimal fashion both insofar as the separation of the ropes of paste from the extrusion group and compliance with the dimension/contour specifications for the biscuits are concerned, with everything being achieved through simple regulations and/or operating action on a control panel and the aid of electromechanical and mechanical means that are simple yet reliable on a long term basis.

A further object of the invention is to make provision for sweetened paste of any hardness to be kneaded in an extremely simple and compact machine which, compared with the results achievable therewith, is not at all complicated to construct and is easy to maintain.

The foregoing objects are indeed attained with the automatic machine according to the invention, for forming and distributing bakery products of various shapes in baking tins, of the type that comprises: a sweetened paste kneading device, operated by a first geared motor, provided to supply the said paste to an extrusion group connected thereto; a conveyor, driven by a second geared motor, for supplying baking tins in succession to the overhead said extrusion group; means for the oscillating rotation of the said conveyor, at an adjustable angle, operated by a third geared motor; and a cutter device, operated by the said third geared motor, placed at the side of the said extrusion group and operating underneath this in order to cut the extruded ropes of sweetened paste into a number of products of predetermined length; the said extrusion group being constituted by two vertical tubular blocks, coupled telescopically one to the other, with the first tubular block placed beneath and integral with the frame of the said kneading device, and with the second tubular block sliding axially with respect to the first, in contrast with elastic means, under the action of corresponding control means, the said second tubular block being closed at the bottom by an extrusion plate provided with a plurality of molds and defining, with the said two tubular blocks, a variable volume chamber; electrical means being connected to the said cutter device, to the said conveyor, and to the said means for the oscillating rotation of the latter, for operating contemporaneously or alternately the said conveyor and the said paste kneading device, and for operating alternately the said cutter device and the said means for the oscillating rotation of the said conveyor.

BRIEF DESCRIPTION OF THE DRAWINGS

Characteristics of the invention that are not immediately apparent from the description given above, are emphasized hereinafter, with particular reference to the accompanying table of drawings, in which:

FIGS. 5 and 6 show, in a head-on perspective view and in a bottom to top view, respectively, the extrusion group together with the remaining elements of the said means for the rotating operation of the molds;

FIG. 8 shows, diagrammatically in a perspective view, part of the electromechanical means with which the machine is provided;

FIGS. 11a, 11b and 11c show, diagrammatically and qualitatively, phase graphs, the ones in FIGS. 11a and 11b relating to the creation of "piped" and "poured in"

Figure 1:
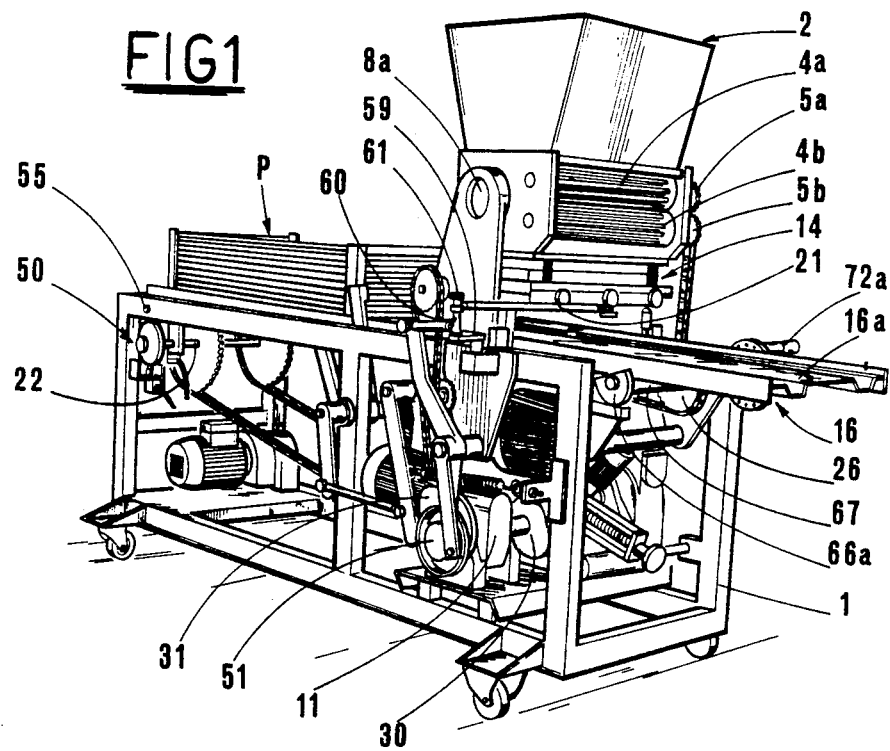
FIGS. 1 and 2 each show, in a perspective view, the machine according to the invention with certain parts removed in order to render others more visible.
Figure 2:
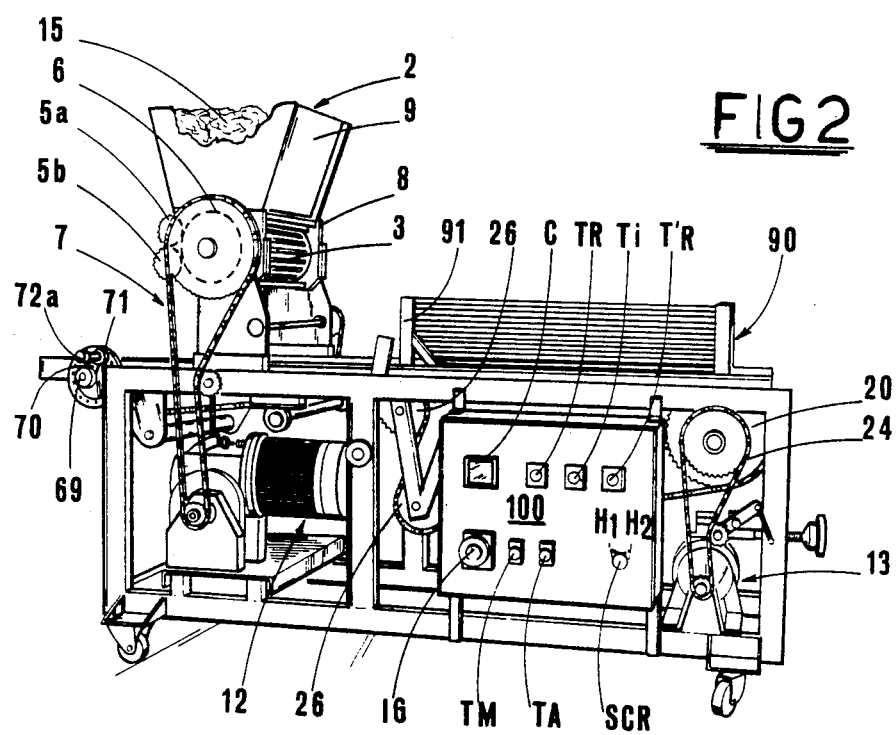

biscuits conducted with the machine in the said "chamber full condition", and that in FIG. 11c relating to the creation of "poured in" biscuit conducted with the machine in the said "chamber empty condition".

DESCRIPTION OF THE PREFERRED EMBODIMENT

With reference to the accompanying figures, at 1 is shown a base frame above which is placed a device 2 for kneading sweetened paste 15. The said device 2 is constituted by three forming cylinders, 3, 4a and 4b, one of which, namely cylinder 3, rotates in the opposite direction to the other two identical cylinders. The cylinders 4a and 4b are turned by means of gears, 5a and 5b, fixedly mounted thereon, which mesh with one and the same gear 6 that is carried in rotation by known means 7 that terminate at a corresponding geared motor 12.

Above the containment body 8 of the said cylinders is placed a hopper 9 for receiving the paste 15, while underneath, integral with the said body 8, an extrusion group 14 is provided and more about this will be said below. The body 8 is able to rotate with respect to a transverse pin 8a, thereby facilitating the cleaning of the device 2 and of the extrusion group 14.

Placed beneath the group 14, virtually in the region of the top plane of the frame 1 and pivotally connected thereto at 55, there is a structure 16 substantially in the form of a "U" that serves as a support (with a surface 16a) and guide for the baking tins 17. From the commencement point to way past the group 14, the support surface 16a has in it two longitudinal grooves 117 inside which slide corresponding continuous conveyor chains 18 provided with a plurality of suitably spaced projections 19 that are destined to thrust the baking tins 17 (in direction T shown in FIG. 3) resting on the structure 16. The chains 18 are wound endlessly around drive pinions 20 (both of which keyed to a shaft 22 pivoted to the base frame 1 and, in turn, carried in rotation, through a chain 24, by a geared motor 13 that is independent of the previously mentioned geared motor 12) and around corresponding driven pinions 26 (in particular three per chain) rotatably supported by the structure 16. One extremity of the shaft 22 is connected to an electromechanical group 50, more about which will be said in due course.

Figure 3:
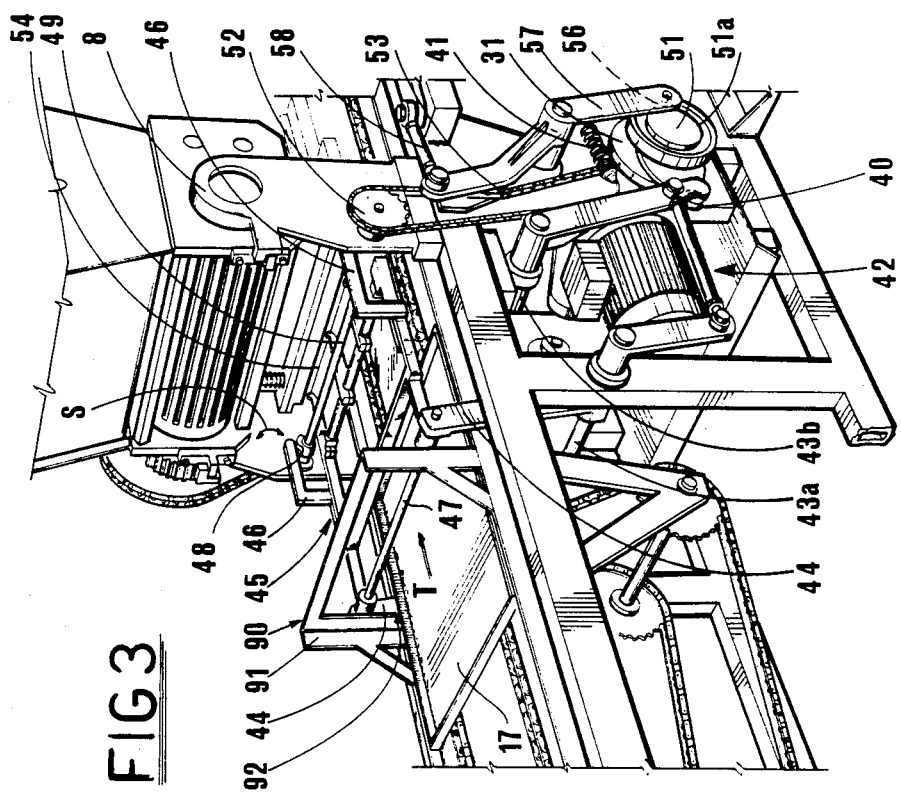
FIG. 3 shows, in a perspective view in a larger scale than in FIGS. 1 and 2, the cutter device plus the means for the operation thereof, and, in part, the means for the rotating operation of the molds of the extrusion group.

At 11 is shown a third and last geared motor, independent of the two previously mentioned geared motors 12 and 13, onto the shaft of which at one side is keyed a first cam 30 (FIG. 4), and at the other, a second cam 31 and a disk 51 (FIG. 3).

Figure 4:
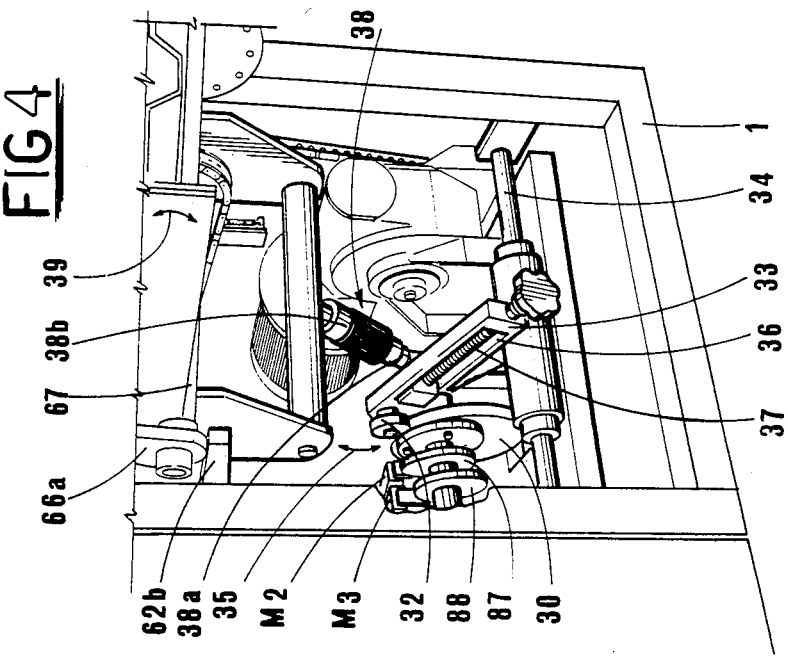
FIG. 4 shows, in a perspective view, the means for the oscillating rotation of the conveyor.

The first cam 30 exerts an action, via a roller 32, on a rocker arm 33 pivoted at 34 to the base frame 1 and thus able to oscillate in both the directions indicated by the arrow 35 (FIG. 4). The said rocker arm 33 is provided longitudinally with a seat 36 along which is able to slide, controlled by an endless screw-knob assembly 37, the extremity 38a of a connecting rod 38 whose upper extremity is pivoted to the underneath of the said structure 16, in proximity of the end part of this (FIG. 4). It ensues that the rotation of the cam 30 causes an intermittent oscillation of the structure 16 (in the directions shown by the arrow 39 in FIG. 4) around the fulcrum 55. The value of the said oscillation, determined by regulating the pivoting point of the extremity 38a (using the knob 37), can vary from a maximum in which the baking tin is in the immediate vicinity of the extrusion group 14 to a minimum in which the structure is no longer subjected to any oscillation; by means of a knob 38b for regulating the length of the connecting rod 38, a variation is made in the distance the said extrusion group 14 and the said structure 16 are apart.

The second cam 31 exerts an action, via a roller 40 maintained in contact there with through a spring 41, on an articulated parallelogram 42 fastened to two transverse shafts 43a and 43b rotatably supported by the frame 1. Fixedly mounted on the shaft 43a are two identical arms 44 that point, one parallel with the other, upwards way past the structure 16.

To the upper extremity of the arms 44 is pivoted, at 47, the rear part of a cutter device 45 (FIG. 3) which, at the front rests, by means of brackets 46, on two cams 48. The said cams are keyed to a transverse shaft 49 (rotatably supported by the said body 8) onto which is fixedly mounted a driven pinion 52 operated by means of a chain 53 that meshes with a drive pinion (not illustrated) keyed to the shaft of the geared motor 11.

The extreme front part of the device 45 is provided with a cutting edge 54 that extends transversely and is given the task of cutting the bakery products exiting from the extrusion group 14 in cases when, as will be explained below, determinate conditions of operation of the machine occur.

The rotation of the cam 31 causes a to-and-fro movement of the device 45 in the direction T, while the rotation of the cams 48 causes the said device to oscillate around the fulcrum 47 in the direction S. The phase relationship between the cam 31 and the cams 48 is such as to position the cutting edge 54 at the maximum height thereof (almost shaving the underneath side of the extrusion group 14) when the device 45 is displaced in the downstream direction, and subsequently to position the cutting edge 54 at the minimum height thereof in synchrony with the return of the said device in the upstream direction. This is advantageous since the cutting edge 54, after having cut the bakery products, does not come into contact with the ropes of sweetened paste exiting from the extrusion group 14.

Between the said body 8 and upstream of the furthermost retracted position adopted by the device 45, a vertical magazine 90 integral with the structure 16 is provided, and this is destined to receive a stack P of baking tins 17. The said magazine is constituted by four vertical angular elements 91 integral with the longitudinal sides of the structure 16, the two front ones of which each have at the bottom a recess 92 destined to allow the longitudinal sides of the bottom baking tin 17 in the stack P to pass freely there through when the said baking tin is intercepted by a pair of the said projections 19.

The outside face of the said disk 51 is provided with an annular groove 51a, eccentric with respect to the axis of the said disk, with which engages a roller 56 cantilever supported by the lower extremity of an arm 57. The center of the said arm is pivoted to the frame 1, while the upper part thereof is pivotally connected to a tie rod 58 which, in turn, is pivoted to a bracket 59 which, centrally and vertically, is pivotally connected to the frame 1. Integral with the said bracket 59 there is a vertical pin 60 to the top of which can be connected, with the aid of a knob 61, a cross bar 21 more about which will be said below.

Downstream of the extrusion group 14, bilaterally to the structure 16, are placed two levers 62, each of which pivoted to a transverse pin coaxial with the other pin and integral with the longitudinal sides of the structure 16. The extremity 62a of each lever is pivotally connected to a corresponding vertical rod 63 freely inserted in a vertical tubular block 64 integral with the corresponding longitudinal side of the structure 16, and the upper part of each rod is rendered integral with a vertical cylinder 65 to which further reference will be made.

The other extremity 62b of each lever 62 is subjected (through elastic means 130) to the action of a cam 66 fixedly mounted on a transverse shaft 67 rotatably supported by the structure 16 (or more precisely, underneath this). Also keyed to the said shaft is a second cam 66a that acts in conjunction with the extremity 62b of the second lever 62 placed on the opposite side, with respect to the structure 16, to the first lever 62. The said cams 66 and 66a are spatially positioned in an identical fashion, by means of a regulating device 68 constituted by a collar 69 keyed to one extremity of the said shaft 67, with which is integral a radial arm 70 whose outer extremity is integral with a transverse bush 71 inside which slides axially a rod 72 (subjected to non illustrated elastic means and operated by a knob 72a), the inner extremity of which protrudes out of the said bush so that it can be inserted in one of a plurality of suitably spaced holes 73 machined in a vertical disk 74 integral with one longitudinal side of the structure 16.

From what has been stated above, it follows that through the device 68 it is possible to regulate the projecting part of the upper extremity of each of the cylinders 65 with respect to the surface 16a supporting the baking tins 17.

The said extrusion group 14 (see FIGS. 5, 6, 9 and 10) is constituted by a first tubular block 75, integral with the bottom part of the body 8, and by a second tubular block 76 placed underneath the first, with which it is telescopically and externally coupled. The vertical sliding motion of the second block 76 is guided by vertical rods 77 enshrouded by corresponding helical springs 78 that support the second block 76 and, at the same time, elastically contrast the raising of this.

The base part of the block 76 is provided with transverse guides 79 destined to receive, coupled thereto, the transverse edges of an extrusion plate 80 of a suitable type (able to be locked to the block 76 in a known fashion by means of the knobs 101) provided with a plurality of molds 81 (having a predetermined profile) aligned transversely, with the axis thereof spaced away from the recesses in the magazine 90 at a distance practically equal to the length of the baking tins.

In one particular application for the machine in question (more about which will be said) the said molds 81 (for example of a star shaped profile) are externally enshrouded by tightly fitted rings 81a provided externally with axially extending straight toothing that meshes with a transverse rack 109 integral with a longitudinal rod 110 pivotally connectible to the said transverse bar 21.

Jointly with the plate 80, the said tubular blocks 75 and 76 defined a chamber 82 whose volume varies from a maximum to a minimum value set by the extreme lowered position and by the maximum uplift, respectively, of the second tubular block 76. The raising of the block 76 is consequential to contact there with being made by the cylinders 65, this resulting from the uplifting of these when the structure 16 rotates upwards.

The electromechanical group 50 with which the machine is provided (see FIG. 8) consists of a disk 83 fixedly mounted on the shaft 22, provided with a radial projecting part 84 that is destined to trip a microswitch RS (connected to a control panel 100). Starting at the said projecting part 84 and working, for example, counter clockwise, the said disk 83 is provided with a plurality of axial projections 86a, . . . 86n (for example: with n=18) that are angularly equidistant and are destined to trip a microswitch $M_1$ connected to the panel 100. It should be noted that the angular displacement between the first projection 86a and the final projection 86n is greater than the angular displacement between any two of the said projections considered in the stated order.

Between the projections 86a and 86n, in an internal position with respect to the radial projecting part 84, fashioned in the disk 83 there is a face cam 85 destined to intercept a microswitch $C_1$ connected to the panel 100.

Furthermore, the machine forming the subject of the invention is provided with two more microswitches $M_2$ and $M_3$ (FIG. 4) destined to be tripped by corresponding cams 87 and 88 fixedly mounted on the shaft of the said geared motor 11.

The said control panel is, among other things, provided on the outside with a master switch $I_G$, two keys $T_M$ and $T_A$ for operating the machine manually and automatically, respectively, a meter C, a changeover switch SCR, and three timers $T_R$, $T_i$ and $T'_R$.

A description will now be given of the operation of the machine assuming that it is wished to create what are known as "piped" biscuits B.

First of all it is necessary to prepare the machine for use, that is to say, to position a baking tin 17 underneath the extrusion group 14 and to fill the chamber 82 with the paste 15. For the formation of "piped" biscuits, the cutter device 45 is rendered operative and the rocker arm 33 inoperative (in other words, it is not made to oscillate the structure 16) and the bar 21 is not used.

For this form of operation, the changeover switch SCR is placed in position $H_1$, the meter is set at value $n=18$ (corresponding to the number of projections 86) and the key $T_M$ is depressed. All this does is to set in operation the geared motor 13 for displacing (direction T) the baking tins until the microswitch $M_1$ is tripped by the projection 86n (the eighteenth tripping operation): graph $D_1$ in FIG. 11a.

The bottom baking tin in the stack P is, in consequence, carried in the direction T and with the halting of the geared motor 13, the front transverse edge of the said tin is one step to the rear with respect to the overhead molds 81.

Subsequently, the operator sets the timer $T'_R$ which, for a $t'_R$ time, allows the geared motor 12 to operate (see graph $D_2$ in FIG. 11a), and in this way the chamber 82 is filled with paste 15.

At this point, the operator sets on the meter C an $\bar{n}$ number that is a submultiple of n (in this way the $n/\bar{n}$ ratio defines the number of transverse rows of biscuits in each baking tin), sets a $t_R$ time on the timer $T_R$ (with $t_R$ less than or equal to the time needed for the disk 83 to rotate by the angle existing between two projections 86 in the order considered), and then, by means of the timer $T_i$, sets a $t_i$ time with $t_R+t_i$ lesser than or equal to the time needed for the disk 83 to cover the angle existing between the projections 86a and 86n.

The operator, at this juncture, depresses the key $T_A$ and this causes the undermentioned succession of events:

the operation of the geared motor 13 (graph $D_1$);
the tripping by the cam 55 of the microswitch $C_1$ whereby the timer $T_i$ is switched in and the timer $T_R$ is switched out; in this way for the $t_i$ time the geared motor 12 is inactive (graph $D_2$); upon the expiry of the said $t_i$ time, a changeover occurs between $T_R$ and $T_i$, that is to say, the timer $T_i$ is switched out and the timer $T_R$ is switched in: this brings about the operation of the geared motor 12 (with the consequent discharge from the orifices of the molds 81 of ropes of biscuits of the predetermined contour) for a $t_R$ time (graph $D_2$);

the tripping (at the t* time) by the projection 86a of the microswitch $M_1$ with the taking out of operation of the geared motor 13 and of the geared motor 12 (if not already rendered inactive by $T_R$), and the operation of the geared motor 11;

the operation of the cutter device 45 with the shearing, by means of the cutting edge 54, of the said ropes at a point corresponding to the underneath of the extrusion group 14 (graph $D_3$, FIG. 11a);

the tripping by the cam 87 of the microswitch $M_2$, with the device 45 in the furthermost retracted position, the consequence of this being the taking out of operation of the geared motor 11 and the synchronous running of the geared motors 12 and 13.

At this stage the geared motor 12 remains in operation for the $t_R$ time, while the geared motor 13 drops out in consequence of the n number of times the projections 86 have been set to trip the microswitch $M_1$. The procedure then continues automatically until the considered baking tin has been filled, that is to say, up until the projection 86n at which point the microswitch $C_1$ comes back into operation and by changing over $T_R$ with $T_i$ and subsequently $T_i$ with $T_R$, makes possible the optimal positioning of the next baking tin beneath the molds 81, as stated previously.

As regards the operation of the RESET microswitch RS, it is stressed that with this, upon completion of one cycle (a complete revolution of the disk 83), it is possible to vary the previously set n number, thereby enabling, in consequence, the number of transverse rows of biscuits for the subsequent baking tins to be varied.

The above operating configuration (pertinent to the state $K_1$ or chamber 82 full condition) enables "piped" biscuits to be created, the profile of which is dependent on the profile of the orifices of the molds, and the length of which is a function of $t_R$.

With the above mentioned $K_1$ state, biscuits of what is called the "poured in" type are also possible, for example sugary type products known in Italy as "spumini", in which there are external helical lines or longitudinal lines.

For "poured in" products to be created, the cutter device 45 has to be rendered inoperative, the rocker arm 33 has to be so set as to obtain a predetermined oscillation of the structure 16 and, to conclude, it is necessary to regulate the projection of the vertical cylinders 65 with respect to the corresponding tubular blocks 64 (done by means of the device 68) in such a way that the contact the cylinders make with the said second tubular block 76 obliges the latter to undergo a predetermined displacement with respect to the first tubular block 75.

The procedure for getting the machine ready to operate, as also the necessary operations for positioning the first baking tin underneath the extrusion group 14, are the same as previously stated for "piped" biscuits.

In this situation the $t_R$ time set with the timer $T_R$ is of a value such as solely to allow the chamber 82 to be filled with the paste 15 (FIG. 9a); see also graph $D_5$ in FIG. 11b.

When the microswitch $M_1$ has been tripped the number of times corresponding to the $\bar{n}$ number set on the meter C, the geared motor 13 ceases operating (the geared motor 12 is already at a standstill since $t_R$ is certainly less than the operating time of the geared motor 13) and this causes the geared motor 11 to be set in operation (see graphs $D_4$ and $D_6$ in FIG. 11b in respect of the operation of the geared motors 13 and 11, respectively).

Figure 9A:
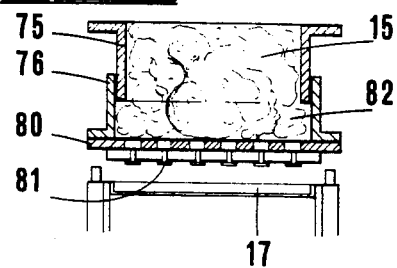
FIGS. 9a, 9b and 9c each show, diagrammatically, one moment in the creation of "poured in" biscuits conducted in what is called the "chamber full condition"
Figure 9B:
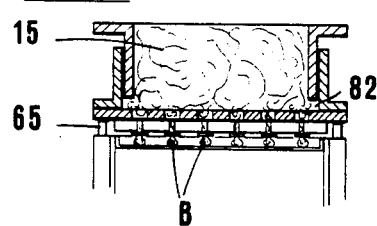

What has just been said involves the raising of the structure 16 with interception of the second block 76 on the part of the cylinders 65; the uplift of the second block brings about a gradual decrease in the volume of the chamber 82; the paste, compressed in this way, consequently spills out of the orifices of the molds 81 and thus the paste is "poured in" onto the underneath baking tin 17 (see FIG. 9b).

Figure 9C:
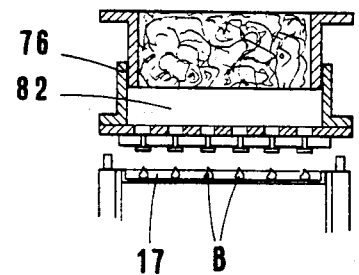

The said flow ceases once the structure 16 reaches the top dead center point, and the subsequent downward displacement of the structure 16 causes the volume of the chamber 82 to increase and this has the effect of decompressing the paste and of the ropes of paste breaking spontaneously, as a consequence, in the region of the said orifices (see FIG. 9c).

When the structure 16 has completed one full oscillation, that is to say, when it has returned to the bottom dead center point, the cam 87 trips the microswitch $M_2$ and this causes the geared motor 11 to drop out and the other two geared motors 12 and 13 to be set contemporaneously in operation. The geared motor 12 remains in operation for the $t_R$ time needed to fill completely the chamber 82 with paste, while the geared motor 13 remains in operation for the time needed to cause the baking tin 17 to move forward by an amount equal to the predetermined distance between two consecutive transverse rows of biscuits B.

The thickness of the "poured in" biscuits created in accordance with the foregoing description is dependent on the spacing in between the blocks 76 and 75, while the contour of the biscuits depends on the profile of the orifices of the molds.

With star shaped orifices (FIG. 6), the sugary products known in Italy as "spumini", in which there are longitudinal lines, are formed. If, instead, it is wished to create "spumini" with helical lines, it is necessary to use molds 81 coupled to the said rings 81a provided externally with straight toothing, to mesh the said toothing with the rack 109 and, lastly, to connect the rod 110 to the transverse bar 21. In this way, on a time relationship basis with the "pouring in" of the biscuits (graph $D_7$ in FIG. 11b), the said molds are made to rotate in a predetermined direction whereby it is possible to produce "poured in" biscuits in which there are external helical lines.

The machine according to the invention enables "poured in" biscuits to be created in an operating condition, or $K_2$ state that is different from the previously mentioned $K_1$ state, in which the chamber 82 is empty.

In the $K_2$ state, the cutter device 45 is rendered inoperative, the bar 21 is not utilized and nor is the timer $T_i$.

As regards the preparation for use of the machine and also the positioning of the first baking tin beneath the extrusion group 14, the information given previously is applicable: the one thing that needs to be stressed is that the microswitch $C_1$ serves solely for halting the geared motor 13.

Figure 10A:
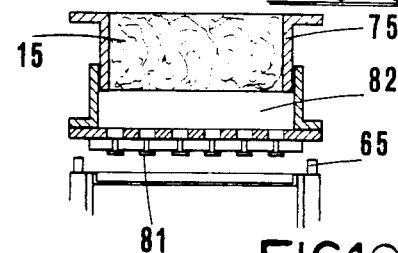
FIGS. 10a, 10b, 10c and 10d show, diagrammatically, four different moments in the creation of "poured in" biscuits conducted in which is called the "chamber empty condition"

In the K₂ state (changeover switch SCR in the H₂ position), when the key $T_A$ is depressed, the chamber 82 is empty (FIG. 10a).

All that the operation of the key $T_A$ does is to set in motion the geared motor 13 which, after the microswitch M₁ has been tripped an $\bar{n}$ number of times (graph $D_8$ in FIG. 11c), comes to a halt (the $\bar{n}$ value being set on the meter C).

Figure 10B:
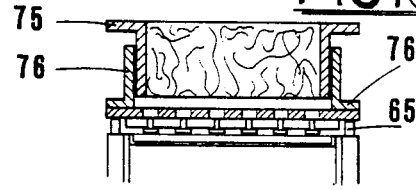

With the dropping out of the geared motor 13, the operation occurs of the geared motor 11 (graph D₉ in FIG. 11c), and in this way the structure 16 is raised and the cylinders 65 cause the block 76 to be displaced upwards: the volume of the chamber 82 decreases (FIG. 10b).

When the structure 16 is at top dead center, the cam 88 trips the microswitch M₃, and this causes the halting of the geared motor 11 (baking tin at a standstill upwards), and the operation of the geared motor 12 (graph D₁₀ in FIG. 11c).

Figure 10C:
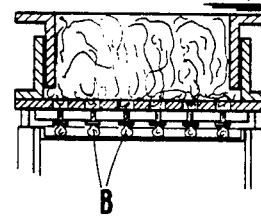

The operation of the geared motor 12 causes paste to be sent into the chamber 82 and subsequently to be "poured in" through the orifices of the molds (FIG. 10c). The geared motor 12 remains in operation for a $t_R$ time suited to the thickness of the "poured in" biscuits being placed in the baking tin. Once the $t_R$ time has elapsed, the geared motor 12 drops out and the geared motor 11 resumes operation (graph D₉ in FIG. 11c).

Figure 10D:
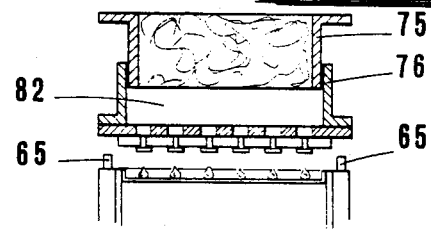
Figure 7:
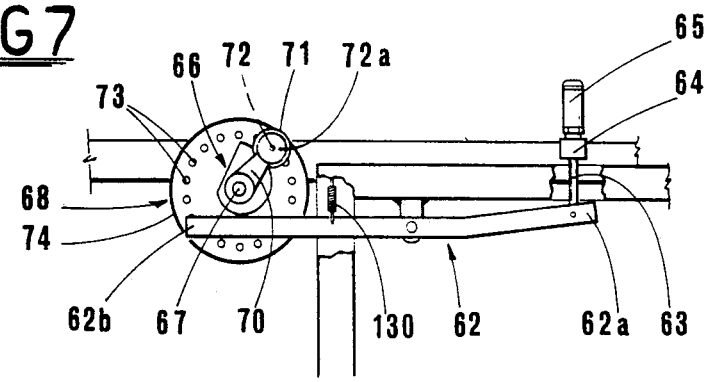
FIG. 7 shows, in a lateral diagrammatic view, the control means of the extrusion group.

The downward displacement of the tubular block 76 causes the decompression of the chamber 82 with the consequent spontaneous breaking of the ropes of paste in the region of the orifices of the molds (FIG. 10d).

With the structure 16 at bottom dead center, the cam 87 trips the microswitch M₂ and this brings about the halting of the geared motor 11 and the operation of the geared motor 13, and thus a fresh cycle, identical to the preceding one, is commenced.

To conclude, with the machine according to the invention it is possible to create "piped" and "poured in" biscuits, the former of predetermined length and contour, the latter of a thickness and contour also predetermined. The special conformation of the extrustion group 14 makes simple and optimal, the regulation of the thichness of "poured in" biscuits and of the contour thereof and, furthermore, the separation of the ropes of paste from the extrusion plate 80 takes place in a reliable way as a consequence of the decompression of the chamber 82.

It is understood that the foregoing description has been given purely as an example and thus that any variations in the constructional details are understood to fall within the framework of protection afforded to the invention as described above and claimed below.

What is claimed is:

1. Automatic machine for forming and distributing bakery products of various shapes in baking tins, of the type that comprises: extrusion means, a sweetened paste kneading device, operated by a first geared motor, provided to supply the said paste to said extrusion means connected thereto; a conveyor, driven by a second geared motor, for supplying baking tins in succession to the overhead said extrusion means; means for the oscillating rotation of the said conveyor, at an adjustable angle, operated by a third geared motor; and a cutter device, operated by the said third geared motor, placed at the side of the said extrusion group and operating underneath this in order to cut the extruded ropes of sweetened paste into a number of products of predetermined length; the said extrusion means being constituted by two vertical tubular blocks, coupled telescopically one to the other, with the first tubular block placed beneath and integral with the frame of the said kneading device, and with the second tubular block sliding axially with respect to the first, control means for said second tubular block, the said second tubular block being closed at the bottom by an extrusion plate provided with a plurality of molds and defining, with the said two tubular blocks, a variable volume chamber; electrical means being connected to the said cutter device, to the said conveyor, and to the said means for the oscillating rotation of the latter, for operating contemporaneously or alternately the said conveyor and the said paste kneading device, and for operating alternately the said cutter device and the said means for the oscillating rotation of the said conveyor.

2. Machine according to claim (1), wheren the said means for controlling the axial displacement of the second tubular block with respect to the first, comprise: two vertical cylinders, positioned bilaterally with respect to the structure supporting the said conveyor, underneath the said second tubular block; two tubular blocks, locked to the corresponding longitudinal sides of the said support structure, inside each of which slides a rod integral at the top with one of the said cylinders; two identical levers pivoted in the center to the said corresponding longitudinal sides, the inner extremity of which exercises an action on the said rods; two identical cams that are fixedly mounted on a transverse shaft, oriented spatially in exactly the same way, and exert an effect, under the action of elastic means, on the corresponding outer extremity of the said levers; and a device, keyed to the said shaft, for regulating the spatial orientation of the said cams with a consequent regulation of the position of the said cylinders with respect to the surface supporting the said baking tins.

3. Machine according to claim (1), in which the said molds are supported by the said extrusion plate, and wherein the said molds are coupled externally to corresponding rings provided externally with axially extending straight toothing, all of which meshing with one single transverse rack driven with rectilinear reciprocating motion by means operated by the said third geared motor.

4. Machine according to claim (1), in which the said means for the oscillating rotation of the conveyor are rendered inoperative, and wherein the said electrical means comprise: a first consent device M₁ destined to "feel" a succession of projections distributed, from the first to the last, in an angularly equidistant fashion over the circumference of a disk turned by the said second geared motor; a meter C, connected to the said first consent device M₁, destined, for a set $\bar{n}$ number of projections, to take out of operation the said first and second geared motors, and to set in motion the said third geared motor with the consequent operation of the said cutter device; a second consent device M₂ subjected to a cam fixedly mounted on the shaft of the said third geared motor, destined, after one revolution or a fraction of a revolution of the said shaft, to take out of operation the said third geared motor and set in motion the said second geared motor as well as give consent to the setting in operation of the said first geared motor; a first timer $T_R$, destined, after a predetermined $t_R$ time that commences with the operation thereof, to take out of operation the said first geared motor; a second timer $T_i$, destined to maintain non-operative the said first geared motor for a $t_i$ time that commences when consent is given to the operation thereof; and a third consent device $C_1$ subjected to a face cam provided on the said disk and positioned between the central angle existing between the last and the first of the said projections, destined, when tripped, to render operative the second timer $T_i$ and inoperative the first timer $T_R$ and, once the $t_i$ time in respect of the said second timer has elapsed, to render operative the first timer $T_R$ and inoperative the second timer $T_i$.

5. Machine according to claim (1), in which the said cutter device is rendered inoperative, and wherein the said electrical means comprise: a first consent device $M_1$ destined to "feel" a succession of projections distributed, from the first to the last, in an angularly equidistant fashion over the circumference of a disk carried in rotation by the said second geared motor; a meter C, connected to the said first consent device $M_1$, destined, for a set $\bar{n}$ number of projections, to take out of operation the said first and second geared motors, and to set in motion the said third geared motor with the consequent operation of the means for the oscillating rotation of the said conveyor; a second consent device $M_2$ subjected to a cam fixedly mounted on the shaft of the said third geared motor, destined, after one revolution or a fraction of a revolution of the said shaft, during which the said means that operate the extrusion group, together with the elastic means relevant thereto, cause the said second tubular block to be raised and subsequently lowered, to take out of operation the said third geared motor and set in motion the said second geared motor as well as given consent to the setting in operation of the said first geared motor; a first timer $T_R$, destined, after a predetermined $t_R$ time that commences with the operation thereof, to take out of operation the said first geared motor; a second timer $T_i$, destined to maintain non-operative the said first geared motor for a $t_i$ time that commences when consent is given to the operation thereof; and a third consent device $C_1$ subjected to a face cam provided on the said disk and positioned between the central angle existing between the last and the first of the said projections, destined, when tripped, to render operative the second timer $T_i$ and inoperative the first timer $T_R$ and, once the $t_i$ time in respect of the said second timer has elapsed, to render operative the first timer $T_R$ and inoperative the second timer $T_i$.

6. Machine according to claim (1), in which the said cutter device is rendered inoperative, and wherein the said electrical means comprise: a first consent device $M_1$ destined to "feel" a succession of projections distributed, from the first to the last, in an angularly equidistant fashion over the circumference of a disk carried in rotation by the said second geared motor; a meter C, connected to the said first consent device $M_1$, destined, for a set $\bar{n}$ number of projections, to take out of operation the said first and second geared motors, and to set in motion the said third geared motor with the consequent operation of the means for the oscillating rotation of the said conveyor, as well as on a phase relationship basis with these, the operation of the rack drive means for controlling the rotation of the said molds; a second consent device $M_2$ subjected to a cam fixedly mounted on the shaft of the said third geared motor, destined, after one revolution or a fraction of a revolution of the said shaft, during which the said means that operate the extrusion group, together with the elastic means relevant thereto, cause the said second tubular block to be raised and subsequently lowered, and during which the said rack is made to displace in a predetermined direction, to take out of operation the said third geared motor and set in motion the said second geared motor as well as give consent to the setting in operation of the said first geared motor; a first timer $T_R$, destined, after a predetermined $t_R$ time that commences with the operation thereof, to take out of operation the said first geared motor; a second timer $T_i$, destined to maintain non-operative the said first geared motor for a $t_i$ time that commences when consent is given to the operation thereof; and a third consent device $C_1$ subjected to a face cam provided on the said disk and positioned between the central angle existing between the last and the first of the said projections, destined, when tripped, to render operative the second timer $T_i$ and inoperative the first timer $T_R$ and, once the $t_i$ time in respect of the second timer has elapsed, to render operative the first timer $T_R$ and inoperative the second timer $T_i$.

7. Machine according to claim (1), in which the said cutter device is rendered inoperative, and wherein the said electrical means comprise: a first consent device $M_1$ destined to "feel" a succession of projections distributed, from the first to the last, in an angularly equidistant fashion over the circumference of a disk carried in rotation by the said second geared motor; a meter C, connected to the said first consent device $M_1$, for a set $\bar{n}$ number of projections, to take out of operation the said second geared motor and, in synchrony, set in motion the said third geared motor with the consequent operation of the means for the oscillating rotation of the said conveyor; a fourth consent device $M_3$ subjected to a cam fixedly mounted on the shaft of the said third geared motor, destined, after a fraction of a revolution of the said shaft, during which the said means that operate the extrusion group define the maximum raised position of the said second tubular block, to take the third geared motor out of operation coincidently with the said raised position and to set in motion the said first geared motor; a timer $T_R$, destined, after a predetermined $t_R$ time that commences with the operation thereof, to take out of operation said first geared motor and, after the said $t_R$ time has elapsed, to set anew in motion the third geared motor; and a second consent device $M_2$ subjected to a cam fixedly mounted on the shaft of the third geared motor, destined, after a fraction of a revolution of the said shaft and upon the lowered position of the said conveyor being reached, to take out of operation the third geared motor and set in motion the second geared motor.

8. Machine according to claim (1), in which a cam, fixedly mounted on the shaft of the third geared motor, operates an articulated parallelogram that is fastened to two transverse shafts, supported rotatably by a base frame, and is subjected to elastic means, and there are two identical arms fixedly mounted on one of the said transverse shafts, oriented upwards and protruding way past the support structure of the said conveyor, and wherein the said cutter device is pivotally connected, at the back, to the said arms and, at the front, rests on at least one cam carried in rotation by means operated by the said third geared motor on a phase relationship basis with the said cam that operates the said articulated parallelogram, the said cam on which the front part of the cutter device rests being provided to oblige the cutting edge of the said cutter device to be in the maximum raised position when the device is in the extreme position in the downstream direction, and to be lowered in synchrony with the return of the said device in the upstream direction.

9. Machine according to claim (3), wherein the means that operate the said transverse rack comprise: a longitudinal rod integral there with; a transverse bar, on one side pivoted to the said rod, and on the other to a bracket, the fulcrum of which is integral with the base frame of the said machine; an arm, pivoted at the center to the said frame, the lower part of which is provided with a roller that slides in an annular groove made eccentrically in one side of a disk fixedly mounted on the shaft of the said third geared motor; and a tie rod, on one side pivoted to the upper extremity of the said arm, and on the other, to the said bracket.

10. Machine according to claim (2), wherein the said device for regulating the spatial orientation of the said two identical cams destined to adjust the displacement of the said cylinders with respect to the surface on which the baking tins are supported, comprises: a collar fixedly mounted on one extremity of the transverse shaft, with which the said cams are integral; a radial arm integral with the said collar, supporting a transverse bush; a vertical disk, at one longitudinal side integral with the support structure of the said conveyor, provided with a plurality of holes distributed over the circumference thereof; a rod freely inserted in the said bush, subjected to elastic means and destined for the inner extremity thereof to be inserted into one of the said holes; and a knob for controlling the said rod.

11. Machine according to claim 4 or 5 or 6 or 7, wherein the said electrical means comprise a fifth consent device RS tripped by a radial projecting part provided on the said disk in a position in between the first and the last of the said projections, the said consent device RS exerting an effect on the said meter whereby, after one full revolution of the said disk, it is possible to vary the $\bar{n}$ number set previously on the said meter.

12. Machine according to claim 4 or 5 or 6 or 7, wherein the said electrical means comprise a key $T_M$ for manually operating the said second geared motor and destined to set this in motion until the said first consent device $M_1$ is tripped upon an $\bar{n}$ number set on the meter C being realized.

13. Machine according to claim 4 or 5 or 6 or 7, wherein the said electrical means comprise a third timer $T'_R$ destined, for a predetermined time $t'_R$, to set in motion the said first geared motor.

14. Machine according to claim (8), wherein is provided, upstream of the furthermost retracted position adopted by the said cutter device, a vertical magazine in which to contain a stack of baking tins, constituted by four vertical angular elements placed at the vertices of a rectangle and integral with the longitudinal sides of the said support structure, the two front elements each having at the bottom a recess destined to allow the longitudinal sides of the bottom baking tin in the stack to pass there through as a consequence of the said baking tin being intercepted by projections integral with the said conveyor, destined to thrust the said baking tin onto the support surface of the structure on which the baking tins are guided.

* * * * *